United States Patent
Song

(10) Patent No.: US 7,522,380 B2
(45) Date of Patent: Apr. 21, 2009

(54) HEAD TO DISC INTERFACE TUNNELING GIANT MAGNETORESISTIVE SENSOR

(75) Inventor: Dian Song, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 274 days.

(21) Appl. No.: 11/152,471

(22) Filed: Jun. 14, 2005

(65) Prior Publication Data
US 2006/0279877 A1 Dec. 14, 2006

(51) Int. Cl.
*G11B 5/127* (2006.01)
(52) U.S. Cl. .................................. 360/125.33
(58) Field of Classification Search .............. 360/317, 360/125.33, 122, 324.1, 324.11, 324.12, 360/324.2; 428/827
See application file for complete search history.

(56) References Cited

U.S. PATENT DOCUMENTS

| | | | | |
|---|---|---|---|---|
| 4,317,148 | A * | 2/1982 | Chi ........................ | 360/125.22 |
| 5,113,575 | A * | 5/1992 | Fedeli et al. ............ | 29/603.08 |
| 5,695,864 | A * | 12/1997 | Slonczewski ............... | 428/212 |
| 5,898,548 | A | 4/1999 | Dill et al. | |
| 6,700,761 | B2 * | 3/2004 | Ihara et al. .................. | 360/327 |
| 6,785,092 | B2 * | 8/2004 | Covington et al. ..... | 360/125.45 |
| 6,809,900 | B2 * | 10/2004 | Covington ............. | 360/125.01 |
| 6,813,115 | B2 * | 11/2004 | Van der Heijden et al. ....................... | 360/125.12 |
| 7,242,045 | B2 * | 7/2007 | Nguyen et al. ............... | 257/295 |
| 7,245,462 | B2 * | 7/2007 | Huai et al. ............. | 360/324.11 |
| 7,313,013 | B2 * | 12/2007 | Sun et al. ..................... | 365/158 |
| 2005/0041342 | A1* | 2/2005 | Huai et al. ............. | 360/324.12 |
| 2005/0057862 | A1* | 3/2005 | Fukuzawa et al. ........... | 360/313 |
| 2005/0219768 | A1* | 10/2005 | Nakamura et al. ....... | 360/324.1 |
| 2006/0044703 | A1* | 3/2006 | Inomata et al. .......... | 360/324.1 |
| 2006/0146451 | A1* | 7/2006 | Inomata et al. .......... | 360/324.2 |
| 2008/0019058 | A1* | 1/2008 | Saito ....................... | 360/324.1 |

OTHER PUBLICATIONS

Kiselev et al. "Microwave oscillations of a nanomagnet driven by a spin-polarized current".
Knigge et al. "Influence of contact potential on slider-disk spacing: Simulation and experiment". *IEEE Transactions on Magnets*, vol. 40, No. 4, pp. 3165-3167 (Jul. 2004).
Makarova et al. "Magnetic Carbon". *Letters to Nature*, vol. 413, pp. 716-718 (Oct. 2001).
Moodera et al. "Quantum well states in spin-dependent tunnel structures". *Physical Review Letters*, vol. 83, No. 15, pp. 3029-3032 (Oct. 1999).
Rajca et al. "Magnetic ordering in an organic polymer". *Science*, vol. 294, pp. 1503-1505 (Nov. 2001).
Singh et al. "A novel wear-in pad approach to minimizing spacing at the head/disk interface". *IEEE Transactions on Magnets*, vol. 40, No. 4, pp. 3148-3152 (Jul. 2004).
Slonczewski. "Conductance and exchange coupling of two ferromagnets separated by a tunneling barrier". *Physical Review B*, vol. 39, No. 10, pp. 6995-7002 (Apr. 1989).

* cited by examiner

*Primary Examiner*—Angel A. Castro
(74) *Attorney, Agent, or Firm*—Campbell Nelson Whipps LLC

(57) ABSTRACT

A transducer for magnetically reading and writing information is disclosed. The present invention eases the intricate process of wafer thin film deposition and bar lapping by proposing a transducer including a first and second member, both of which perform the reading and writing function of the transducer. The present invention provides a transducer with greatly improved magnetic efficiency by probing the media magnetization directly. The structure is inherently stable due to shape anisotropy of the members and the closure of magnetic flux at the ends of each member.

24 Claims, 5 Drawing Sheets

HEAD TO DISC INTERFACE TUNNELING GIANT MAGNETORESISTIVE SENSOR

FIELD OF THE INVENTION

The present invention generally relates to magnetic read and write heads for high areal density recording, and in particular the present invention relates to producing one device which increases the efficiency, yield and reliability of a merged magnetic writer and reader component.

BACKGROUND OF THE INVENTION

As the density of data tracks on magnetic discs continues to increase, increased magnetic efficiency and high manufacturability of the magnetic read/write head, or transducer, is required. Typically, the transducer consists of separate writer and reader elements. One type of writer element is a perpendicular writer. Perpendicular recording, as opposed to the more conventional longitudinal recording, is a form of magnetic recording in which magnetic moments representing bits of data are orientated perpendicularly to the surface of the recording layer of the recording medium. Perpendicular recording offers advantages over longitudinal recording, such as the ability to achieve higher linear densities, which is important to extending disc drive technology beyond current data density limitations.

The reader element is made of multi-layers of magnetic and non-magnetic thin films between which there are magnetic, electrical and physical-chemical interactions. Managing the manufacturing yield and reliability of this complicated structure is becoming increasingly difficult as areal density and head to media spacing becomes smaller. Beyond manufacturing difficulties, the currently designed reader elements depend on the media magnetic flux to rotate the free layer. Consequently, the reader and the shields much be designed so that; a) the media flux reaching the free layer is maximized while b) the shield-shield spacing remains small to maintain bit density. Requirements a) and b) are often conflicting and a compromise must be reached.

Transducers are produced by thin film deposition techniques. In such a process, arrays of transducers are formed on a common substrate or wafer. The wafer is inspected, and is then sliced to produce bars. The bars are then lapped at the surface that will eventually face the recording medium to obtain the desired magnetoresistive element height (also referred to as stripe height). Finally, the bars are diced to form individual sliders, each with a transducer. This conventional process can be problematic for at least two reasons. First, the thin film deposition process is expensive and time consuming. Because of the complexity of depositing multiple layers of different materials, variations can arise between processed wafers, which can result in problems in performance, reliability and predictability. Second, if the lapping process is slightly off, or produces inconsistent magnetoresistive element height, the end product will suffer in performance and in reliability. Other parameters that are considered during the lapping process are metal smearing (corrosion), shorting across the gap (surface finish), pole tip recession and protrusion. Therefore, there is a need for a transducer that can be used for high areal density that is less intricate in terms of the thin film deposition process and the lapping process.

The present invention addresses these and other needs and provides advantages that will become apparent to those skilled in the art.

SUMMARY OF THE INVENTION

The present invention provides a transducer, or magnetic head, including a first and second ferromagnetic member, wherein the first and second ferromagnetic member are electrically isolated and configured for magnetic reading and writing.

In an alternative embodiment, a magnetic read and write element are formed in a body, wherein the magnetic read and write element comprise a first and second magnetic member, the first magnetic member being magnetically fixed in a first direction and the second magnetic member being magnetically fixed in a second direction opposite the first direction.

Further, in another alternative embodiment, the present invention includes a magnetic read and write sensor including a first and second ferromagnetic member positioned in a body, a storing medium adjacent the body and a barrier layer positioned between the body and the storing medium.

These and various other features as well as advantages which characterize the present invention should be apparent to those skilled in the art upon reading the following detailed description and review of the associated drawings.

DETAILED DESCRIPTION

Figure 1:
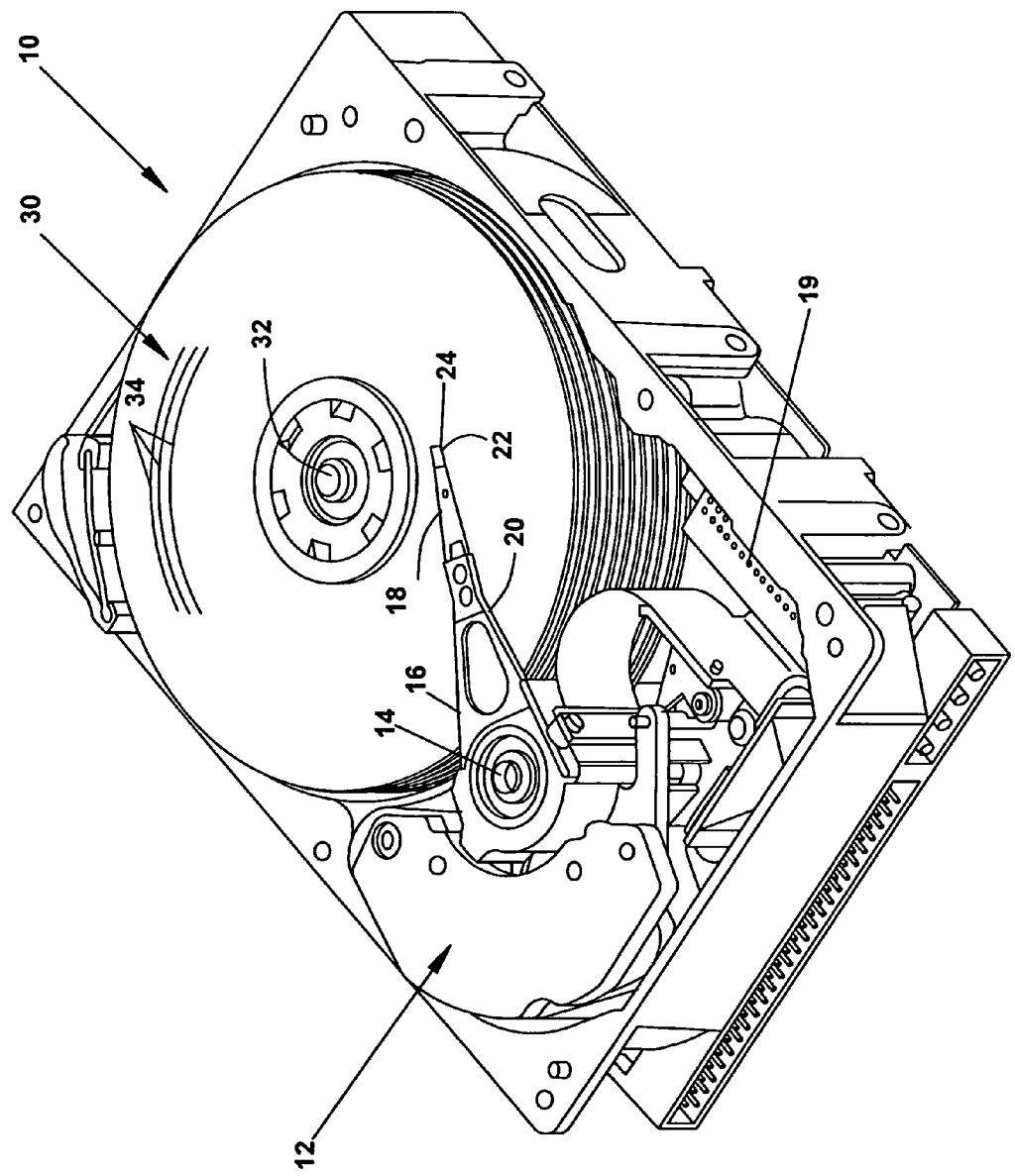
FIG. 1 is a perspective view of a disc drive in which the present invention is useful.

FIG. 1 is a perspective view of a disc drive 10 including a dual-stage disc drive actuation system for positioning a head-carrying slider over a track 34 of disc (or storage medium) 30. Disc drive 10 includes voice coil motor 12 arranged to rotate actuator arm 16 on a spindle around axis 14. Head suspension 18 is connected to actuator arm 16 at head mounting block 20. A slider 24 is attached to head suspension 18 by flexure 22, which in turn carries a transducer for reading and/or writing data on concentric tracks on disc 30. Disc 30 rotates around axis 32, so that windage is encountered by slider 24 to keep it aloft a small distance above the surface of disc 30. Disc drive 10 also includes board electronics 19, which hosts various circuitry for disc drive 10.

Figure 2:
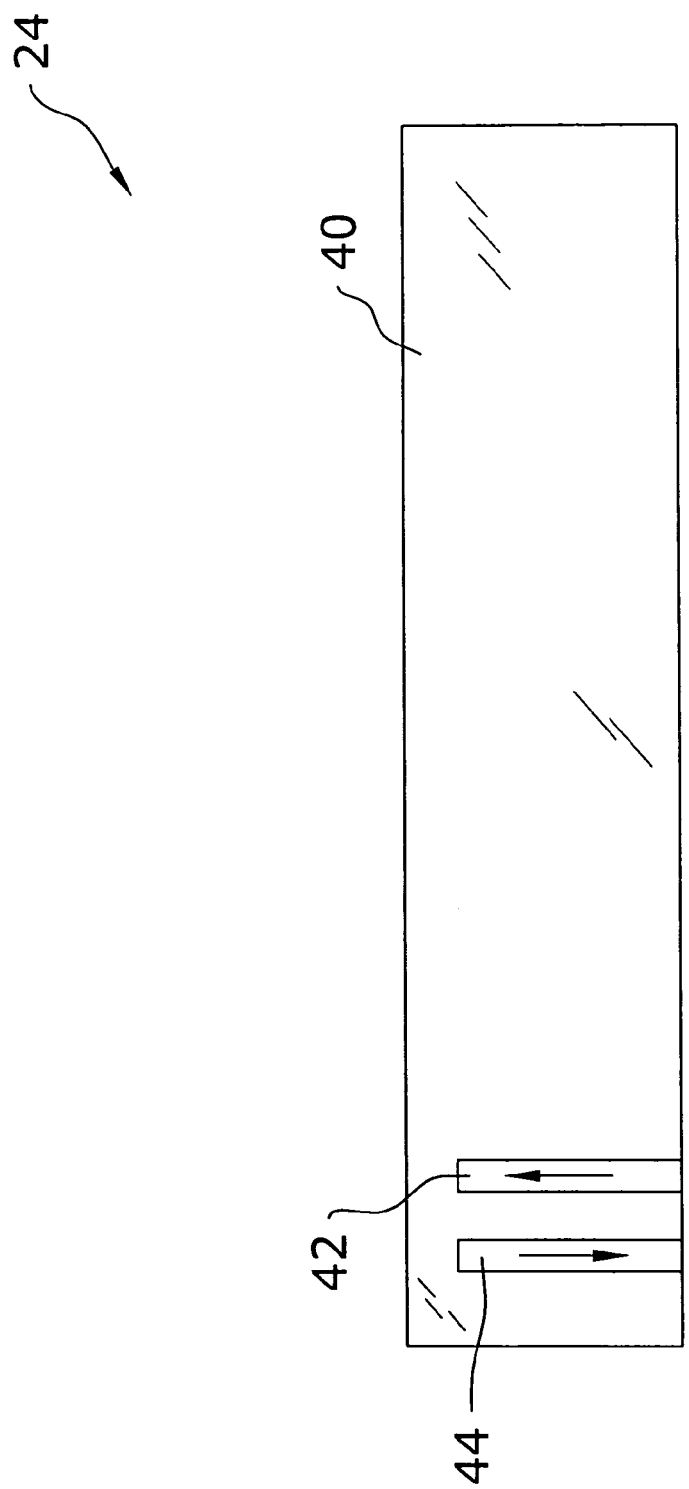
FIG. 2 is a cross-sectional view of the transducer according to the present invention.

Referring now to FIG. 2, the magnetic storage device 24 according to the present invention will be described. The storage device includes a body 40 (or slider), which contains a first member 42 and second member 44. The body preferably is made of a ceramic material, or can be made up of AlTiC, alumina, or a combination of both. The first and second members are composed of a ferromagnetic material, such as NiFe. The magnetization of each member is fixed. This can be achieved by a number of techniques including, but not limited to, shape anisotropy, magneto-strictive anisotropy, crystalline anisotropy, or by using an AFM pinning layer. The first and second member are electrically isolated or insulated from each other. The cross-section of each of the first and second member defines the recording areal density, in that it will define the dimensions of the written track. A typical cross-section for an areal density of 100 Gbit/inch$^2$ is approximately 100 nm by 100 nm. Also, the first and second member can be configured either in a side-by-side configuration or a front-and-back configuration. In the preferred embodiment, the first and second members are shown in a front-and-back configuration.

The first and second members collectively perform both the reading and writing operation. For the writing operation, a current is passed through one of the first or second members and across the head-disc interface into the media (shown in FIGS. 3a-c). Current passed through a member fixed away from media will write a bit in a different direction than current passed through a member fixed toward the media. For sufficiently high current density, the injected spin dominates over local spin, thereby changing the media magnetization and achieving writing. A current to achieve spin oscillation, the beginning of spin reversal, has been reported to be approximately 3 mA for a structure that has a cross-section of 130 nm by 70 nm, which is achievable with the current preamplifier technology.

For the reading operation, the first and second member each separately with the media form the two electrodes in a spin dependent tunnel junction sensor. Tunneling current from the slider is polarized along a fixed direction, whereas the media magnetization varies as each permanent magnet grain or each written bit passes below the body. Due to the tunneling magnetoresistive effect, the head-disc interface current is modulated by media magnetization, thereby achieving reading.

Figure 5:
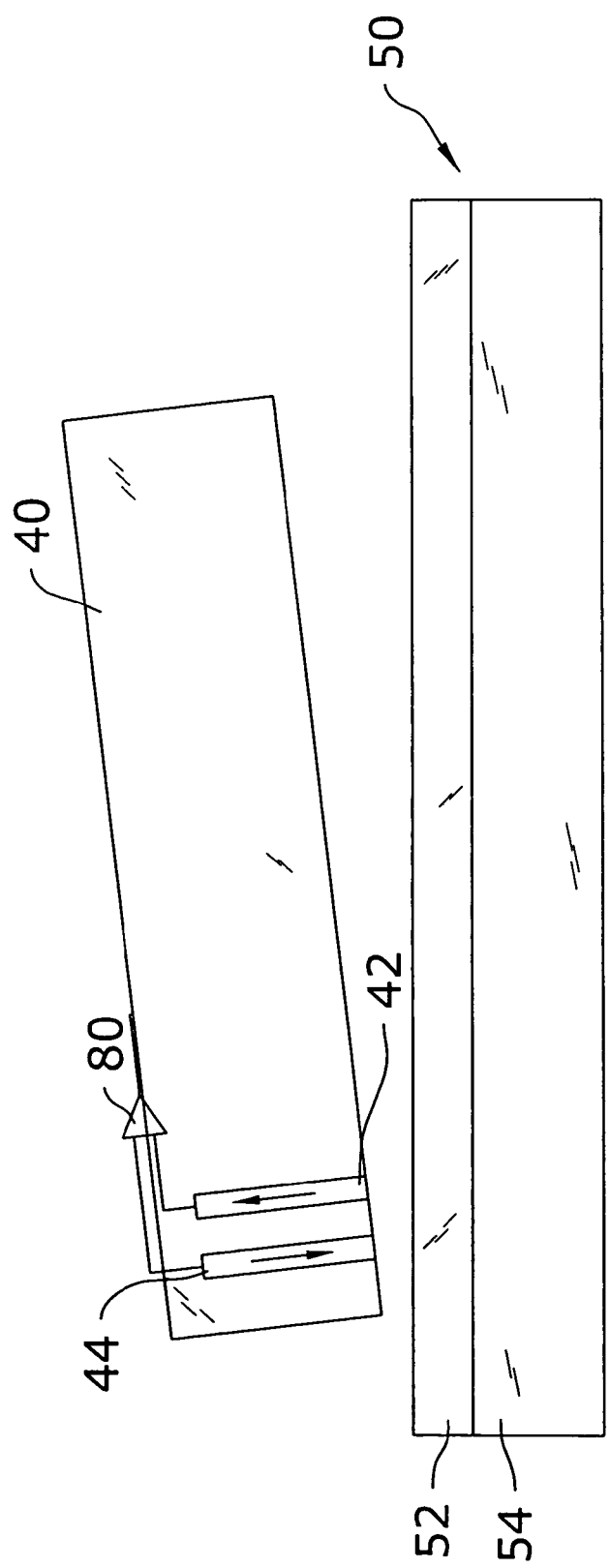
FIG. 5 is a side cross-sectional view of an alternative preferred transducer of the present invention, wherein the transducer is connected to a differential preamplifier.

The signal from the transducer is fed differentially into a preamplifier (shown in FIG. 5). Because there are two readers (the first and second member), there are going to be two signals, called a differential read-back signal. Such an arrangement can greatly improve signal to noise ratio by rejecting common mode signals caused by head to media spacing (HMS) variation, change in lube and disc carbon properties, etc.

The present invention provides a transducer comprised of two members made of essentially one material. This greatly simplifies the wafer process and makes it much less time consuming or expensive. Further, the structure will be essentially insensitive to the lapping process because the structure as presented does not require a controlled stripe height as is required in a conventional design. Also, the structure as presented will be insensitive to any wearing due to contact with the disc. The transducer of the present invention is inherently stable magnetically due to shape anisotropy of the member and due to the flux closure at the end of the tips.

Since the transient electrons across the head to disc interface see only the first mono-layer of magnetic materials at the end of each member, it is advantageous to ensure the magnetization in this layer be fixed along the desired orientation. Additional measures may be taken to further increase the robustness of surface magnetization. These includes: a) reducing the spacing between the two members to improve flux closure, a typical guideline is that the spacing should be less than the member thickness. b) Use of an antiferromagnetic coupling layer, such as Ru, between the two members to strengthen the antiparallel magnetization of the two members, c) Use of antiferromagnetic material to stabilize the member magnetizations. d) Use tapered shapes at the air bearing end of the member to promote single domain structure.

The discussion regarding this concept is directed towards perpendicular type writing, but the present invention may be implemented for longitudinal writing as well. Although the concept would remain the same, to implement the present invention, the magnetization in each member would have to be fixed parallel to the air bearing surface because of the nature of longitudinal recording.

Traditional reader designs rely on the magnetic field emitted from the media being detected by the reader element. The chain of signal transfer is media spin polarization, media field, reader field, reader free layer rotation, and finally magnetoresistive signal. Each of these four steps of transformations involves efficiency losses. They all introduce important design constrains. By detecting the media spin directly, the present invention does not rely on magnetic field detection. As a result, three steps of transformation are removed from the middle of the chain. The media spin polarization is transformed directly into a magnetoresistive signal in the two members.

The concept discussed in the present invention could be performed using one member, rather than two. If one member were used, the magnetization of the member could not be fixed, because magnetization fixed towards and away from the magnetic media are needed in order to write bits of data on the magnetic media in two directions. Therefore, the magnetization of the member would need to have the ability to be altered, likely using a coil.

Figure 3A:
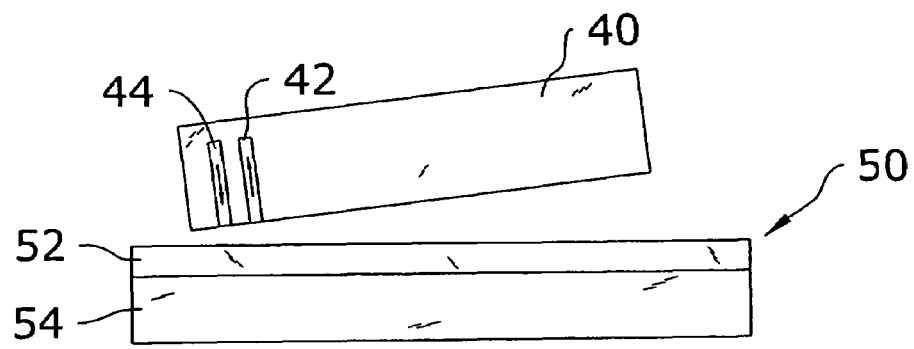
FIG. 3A is a cross-sectional view of an alternative preferred embodiment of the present invention, wherein the transducer includes a storage medium.
Figure 3B:
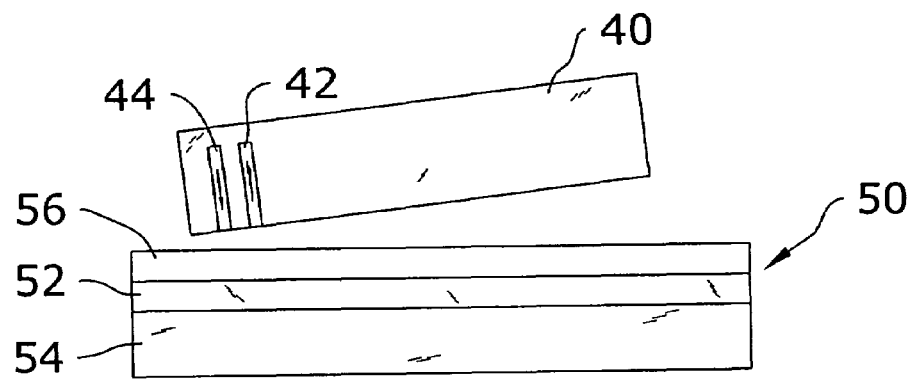
FIG. 3B is a cross-sectional view of an alternative preferred embodiment of the present invention, wherein the storage medium includes a lubrication layer.
Figure 3C:
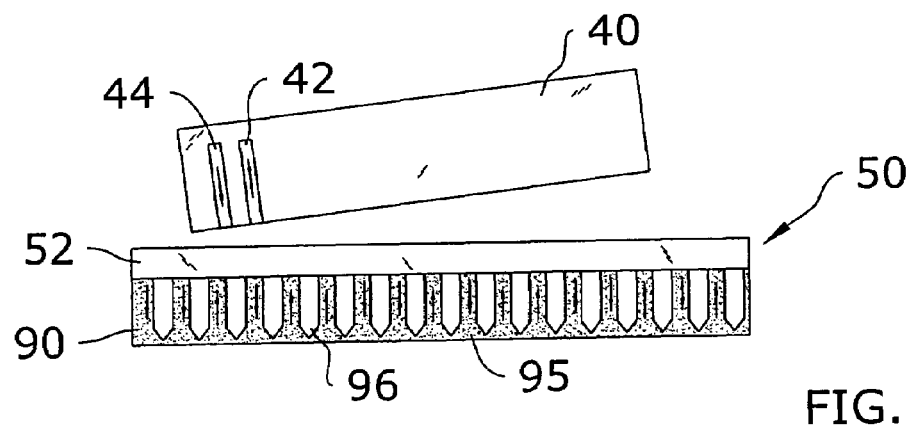
FIG. 3C is a cross-sectional view of an alternative preferred embodiment of the present invention, wherein the storage medium includes a magnetic matrix layer.

As mentioned above, the present invention can be utilized with magnetic media. FIGS. 3a, 3b and 3c each show different embodiments of magnetic media. FIG. 3a is a cross-sectional view of the present invention with media 50. Media 50 includes an overcoat layer 52 and a magnetic storage layer 54. In this embodiment, the overcoat layer 52 is preferably composed of a metal oxide. In this embodiment, the air between the body 40 and media 50 (also called the fly height), along with the overcoat layer 52 will perform as a barrier layer in a tunneling magnetoresistive sensor, for the reading operation. The fly height should be below 10 nm to ensure good tunneling between the members and the magnetic storage layer 54, and to ensure a reasonably low bias voltage. An example of an acceptable metal oxide is TiOx, which has a barrier height much below 1.0 eV so that the tunneling resistance remains low when the film has sufficient thickness to protect the magnetic layers. TiOx is a dense and stable material that offers good chemical corrosion resistance and good wearability. The thickness of the overcoat layer 52 should not be greater than 5 nm to ensure proper tunneling.

Another embodiment, which utilizes magnetic media with the present invention, is FIG. 3b. In FIG. 3b, an additional layer is positioned on media 50. A lube layer 56 is added for protection of the disc, but also to provide the option for contact recording. In this embodiment, the fly height, lube layer 56 and overcoat layer 52 all will act as the barrier layer. The lube layer 56 is preferably less than 2 nm. The lube layer 56 should be electrically insulating and a material that does not scatter spins in the transmitting electrons. Perfloropolyether is widely used as lube in the recording industry. Therefore, it appears to be a good candidate for lube in the present invention. FIG. 3c shows another embodiment that utilizes magnetic media with the present invention. In FIG. 3c, media 50 is comprised of an overcoat layer 52 and a granular permanent magnet matrix layer 90 (herein "matrix layer"). Matrix layer 90 includes a mixture of magnetic columns 95 and non-magnetic columns 96. The column shape grain in a matrix layer helps limit the spread of the tunneling current and thus improves bit and track density.

Figure 4A:
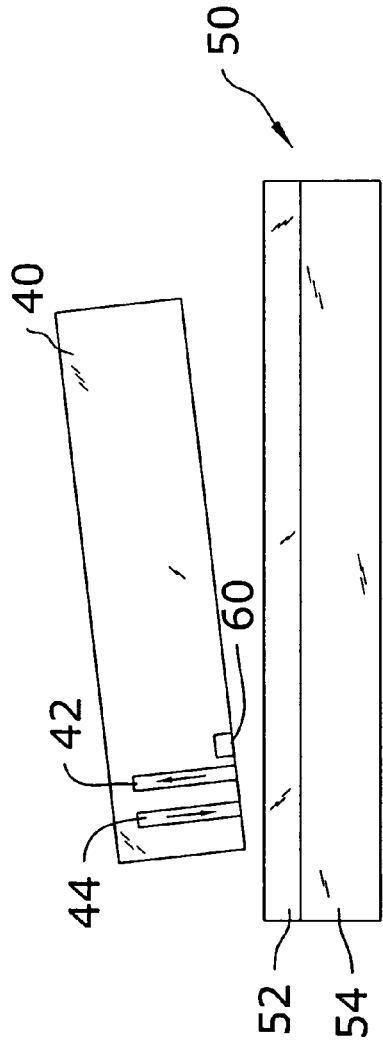
FIG. 4A is a side cross-sectional view of an alternative preferred transducer of the present invention, wherein the transducer includes a current recovery pad.
Figure 4B:
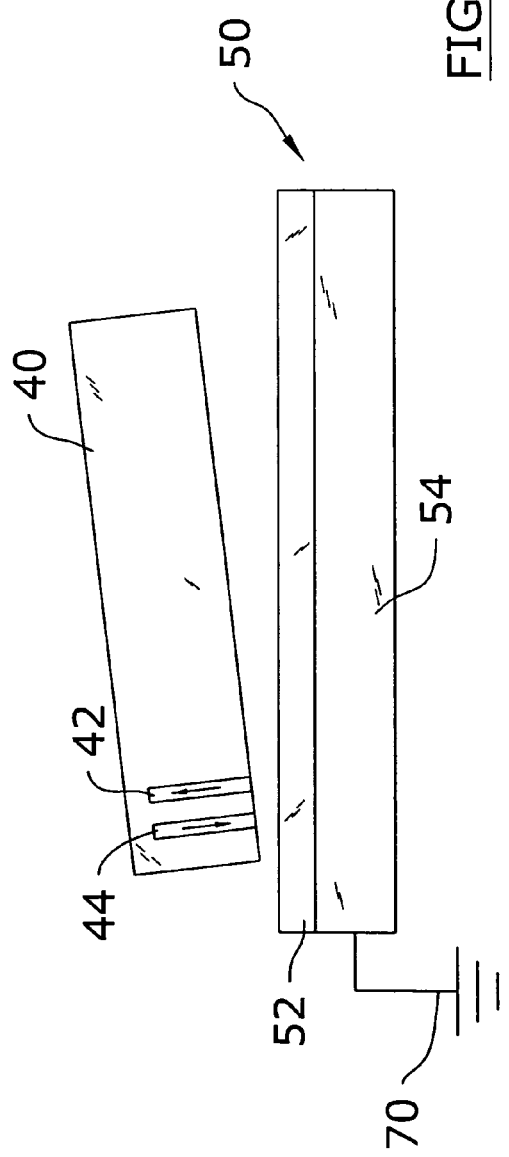
FIG. 4B is a side cross-sectional view of an alternative preferred transducer of the present invention, wherein the storage medium is electrically connected to ground.

The current injected from the slider to the media should have a return path. FIGS. 4a and 4b show embodiments that provide the injected current with such a path. In FIG. 4a, body 40 further includes a current recovery pad 60. Current recovery pad 60 is composed of a non-magnetic material and preferably has a cross-section that is considerably larger than the first and second members to ensure recovery of the injected current. FIG. 4b illustrates a second embodiment to recover the injected current. In this embodiment, the media 50 is grounded 70. This can be done, for example, by electrically connecting the media 50 to the spindle 32 (spindle is shown in FIG. 1)

FIG. 5 is a side cross-sectional view of another embodiment of the present invention, wherein the transducer is connected to a differential preamplifier 80. As discussed above, because the first member 42 and second member 44 function as reader elements of the transducer, two signals for each bit of data will be produced. In order to unify multiple signals and to reduce noise, differential preamplifier 80 is electrically connected to each member. Differential preamplifier 80 can be positioned in or around the slider 40 (as shown in FIG. 5) or can be mounted on a printed circuit board 19 (shown in FIG. 1.).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

I claim:

1. A device comprising:
a body comprising a ceramic material and having an air bearing surface;
a first magnetic member;
a second magnetic member, the first magnetic member magnetically fixed in a first direction and the second magnetic member magnetically fixed in a second direction substantially opposite the first direction, each of the first and second magnetic member configured to transfer spin and sense magnetization, wherein during a write operation one of the first member and the second member transfers spin, and during a read operation, both of the first member and second member sense magnetization.

2. The device of claim 1, wherein the first and second magnetic members are positioned proximate the air bearing surface.

3. The device of claim 1, wherein a current recovery pad is positioned in the body proximate the air bearing surface.

4. The device of claim 1, wherein the device further comprises a magnetic media positioned adjacent the body.

5. The device of claim 4, wherein the magnetic media includes a media overcoat, and a magnetic underlayer.

6. The device of claim 5, wherein the magnetic underlayer is a granular permanent magnetic matrix.

7. The device of claim 5, wherein the media overcoat is composed of a metallic oxide.

8. The device of claim 5, wherein the media overcoat is TiOx.

9. The device of claim 5, wherein the magnetic media is positioned approximately less than 10 nm from the body.

10. The device of claim 5, wherein the magnetic media includes a layer of lubrication.

11. The device of claim 10, wherein the layer of lubrication is approximately less than 2 nm thick and the media overcoat is approximately less than 3 nm thick.

12. The device of claim 11, wherein the magnetic media is approximately less than 10 nm from the body.

13. A data storage device comprising:
a first magnetic member and a second magnetic member positioned in a body, the first and second magnetic members electrically isolated from each other, and each of said first and second members structured and positioned to transfer spin to perform a write operation and to sense magnetization for a read operation;
a storing medium adjacent the body; and
a baffler layer composed of a layer of air positioned between the body and the storing medium.

14. The data storage device of claim 13, wherein the first member is magnetically fixed in a first direction, and the second member is magnetically fixed in a second direction opposite the first direction.

15. The data storage device of claim 13, wherein the body further includes a current recovery pad.

16. The data storage device of claim 13, wherein the layer of air is approximately 4 nm thick.

17. A data storage device comprising:
a first magnetic member and a second magnetic member positioned in a body, the first and second magnetic members electrically isolated from each other, and each of said first and second members structured and positioned to transfer spin to perform a write operation and to sense magnetization for a read operation;
a storing medium adjacent the body; and
a baffler layer positioned between the body and the storing medium wherein the barrier layer is a media overcoat positioned on the storing medium, further wherein the media overcoat is composed of a metallic oxide.

18. The data storage device of claim 17, wherein a layer of lubrication is positioned on the media overcoat, farther wherein the layer of lubrication is approximately 2 nm thick and the media overcoat is approximately 3 nm thick.

19. A device comprising:

a body;

a magnetic media positioned adjacent the body, the magnetic media including a media overcoat and a magnetic underlayer;

a first magnetic member;

a second magnetic member, the first magnetic member magnetically fixed in a first direction and the second magnetic member magnetically fixed in a second direction substantially opposite the first direction, each of the first and second magnetic member configured to transfer spin and sense magnetization, wherein during a write operation one of the first member and the second member transfers spin, and during a read operation, both of the first member and second member sense magnetization.

20. The device of claim 19, wherein the magnetic underlayer is a granular permanent magnetic matrix.

21. The device of claim 19, wherein the media overcoat is composed of a metallic oxide.

22. The device of claim 19, wherein the media overcoat is TiOx.

23. The device of claim 19, wherein the magnetic media is positioned approximately less than 10 nm from the body.

24. The device of claim 19, wherein the magnetic media includes a layer of lubrication.

* * * * *